United States Patent
Takashima et al.

(10) Patent No.: US 9,321,360 B2
(45) Date of Patent: *Apr. 26, 2016

(54) ELECTRONIC CONTROL UNIT

(71) Applicants: KEIHIN CORPORATION, Tokyo (JP); HONDA MOTOR CO., LTD., Tokyo (JP)

(72) Inventors: Yuzuru Takashima, Tochigi (JP); Masaki Tanno, Tochigi (JP); Takeshi Yamada, Tochigi (JP); Haruki Umeya, Saitama (JP); Shinichi Daibo, Saitama (JP)

(73) Assignees: KEIHIN CORPORATION (JP); HONDA MOTOR CO., LTD. (JP)

(*) Notice: Subject to any disclaimer, the term of this patent is extended or adjusted under 35 U.S.C. 154(b) by 389 days.

This patent is subject to a terminal disclaimer.

(21) Appl. No.: 13/648,572

(22) Filed: Oct. 10, 2012

(65) Prior Publication Data

US 2013/0099739 A1    Apr. 25, 2013

(30) Foreign Application Priority Data

Oct. 21, 2011  (JP) ................................. 2011-231805

(51) Int. Cl.
  *H02J 7/00*    (2006.01)
  *B60L 11/18*   (2006.01)
  *B60L 11/12*   (2006.01)

(52) U.S. Cl.
  CPC .......... *B60L 11/1816* (2013.01); *B60L 11/123* (2013.01); *Y02T 10/7005* (2013.01); *Y02T 10/7077* (2013.01); *Y02T 90/127* (2013.01); *Y02T 90/14* (2013.01)

(58) Field of Classification Search
  CPC ... Y02T 10/7005; Y02T 90/14; Y02T 90/127; B60L 11/23

USPC .......................................... 320/104, 107, 109
  See application file for complete search history.

(56) References Cited

U.S. PATENT DOCUMENTS

| 7,688,024 B2 | 3/2010 | Kamaga |
| 8,198,855 B2 * | 6/2012 | Fukui et al. ................... 320/104 |
| 8,258,744 B2 * | 9/2012 | Ishii et al. ..................... 320/104 |

(Continued)

FOREIGN PATENT DOCUMENTS

| CN | 101825688 A | 9/2010 |
| CN | 102216961 A | 10/2011 |

(Continued)

OTHER PUBLICATIONS

Japanese Notice of Reasons for Rejection corresponding to Application No. 2011-231807; Date of Mailing: Jul. 7, 2015, with English translation.
Notice of Allowance corresponding to U.S. Appl. No. 13/654,938, Issued Feb. 25, 2015.
Notice of Reasons for Rejection corresponding to Japanese Application No. 2011-231805; Mailing Date: May 26, 2015, with English translation.

(Continued)

*Primary Examiner* — Helen Rossoshek
(74) *Attorney, Agent, or Firm* — Cantor Colburn LLP

(57) ABSTRACT

An electronic control unit includes a pilot voltage setting circuit that changes a voltage of a pilot signal in a stepwise manner, a processor that controls the pilot voltage setting circuit to change the voltage of the pilot signal, an input buffer that is disposed in a stage preceding a pilot signal input port of the processor, and an input buffer voltage setting circuit that changes an input voltage of the input buffer so as to be within a recommended input voltage range of the input buffer based on the change in the voltage of the pilot signal.

5 Claims, 3 Drawing Sheets

(56) References Cited

U.S. PATENT DOCUMENTS

| | | | |
|---|---|---|---|
| 8,487,636 B2 | 7/2013 | Mitsutani et al. | |
| 8,541,978 B2 | 9/2013 | Fukuo et al. | |
| 8,618,767 B2* | 12/2013 | Ishii et al. | 320/104 |
| 8,768,563 B2 | 7/2014 | Nitzberg et al. | |
| 8,774,997 B2* | 7/2014 | Ichikawa et al. | 701/22 |
| 9,071,070 B2* | 6/2015 | Ohnuki | |
| 2010/0007306 A1* | 1/2010 | Fukui et al. | 320/107 |
| 2010/0079105 A1 | 4/2010 | Iwanaga et al. | |
| 2010/0213896 A1* | 8/2010 | Ishii et al. | 320/109 |
| 2010/0268406 A1* | 10/2010 | Ito et al. | 701/22 |
| 2010/0295507 A1* | 11/2010 | Ishii et al. | 320/109 |
| 2011/0121779 A1* | 5/2011 | Ichikawa et al. | 320/109 |
| 2012/0133325 A1 | 5/2012 | Thomas et al. | |
| 2012/0249066 A1* | 10/2012 | Ichikawa | 320/109 |
| 2013/0099740 A1* | 4/2013 | Takashima et al. | 320/109 |
| 2013/0099742 A1* | 4/2013 | Takashima et al. | 320/109 |
| 2013/0162208 A1* | 6/2013 | Ohnuki | 320/109 |
| 2014/0002011 A1* | 1/2014 | Ang et al. | 320/107 |
| 2014/0002024 A1* | 1/2014 | Ang et al. | 320/109 |
| 2014/0167691 A1* | 6/2014 | Kamaga | 320/109 |
| 2014/0217813 A1* | 8/2014 | Kinomura et al. | 307/10.1 |

FOREIGN PATENT DOCUMENTS

| | | | |
|---|---|---|---|
| JP | 2000049592 A | | 2/2000 |
| JP | 2001339267 A | | 12/2001 |
| JP | 2008076339 A | | 4/2008 |
| JP | 2009-71989 A | | 4/2009 |
| JP | 2009150779 A | | 7/2009 |
| JP | 2010022163 A | * | 1/2010 |
| JP | 2010081740 A | | 4/2010 |
| JP | 2011069694 A | | 4/2011 |
| JP | 2011172327 A | | 9/2011 |
| WO | 9534824 A1 | | 12/1995 |

OTHER PUBLICATIONS

Chinese First Office Action corresponding to Application No. 201210390544.4; Date of Mailing: Sep. 14, 2015, with English translation.

Chinese Office Action corresponding to Application No. 201210395685.5; Date of Mailing: Oct. 10, 2015, with English translation of Search Report.

* cited by examiner

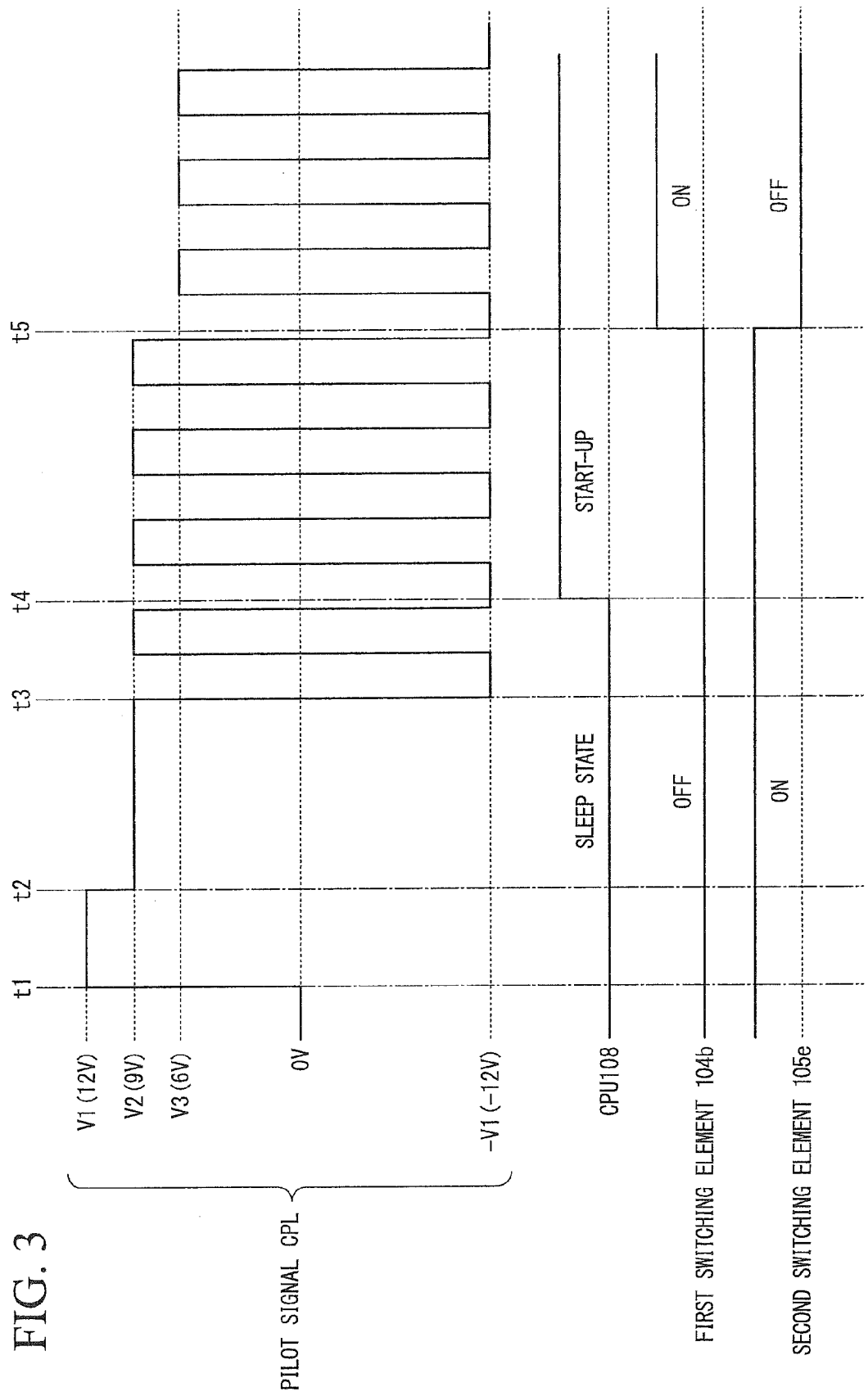

ELECTRONIC CONTROL UNIT

The present invention relates to an electronic control unit.

Priority is claimed on Japanese Patent Application No. 2011-231805, filed on Oct. 21, 2011, the content of which is incorporated herein by reference.

BACKGROUND OF THE INVENTION

1. Field of the Invention

In recent years, vehicles (hereinafter, collectively referred to as plug-in vehicles) such as electric cars or plug-in hybrid cars that can be charged by the use of an external power supply have been increasingly put to practical use. A dedicated charging cable having a control unit called a CCID (Charge Circuit Interrupt Device) is used to connect a plug-in vehicle to an external power supply.

The standard on an interface between the charging cable and the plug-in vehicle is defined by the "SAE (Electric Vehicle Conductive Charge Coupler) standard" of the U.S. or the "General Requirements for Electric Vehicle Conductive Charging System (the Japanese Electric Vehicle Standard)" of Japan. The charging sequence of a plug-in vehicle defined in the standard is substantially as follows.

First, a CCID of a charging cable transmits a control pilot signal (hereinafter, abbreviated as a pilot signal) to a charging-control ECU (Electronic Control Unit) mounted on a plug-in vehicle and determines that the charging cable is connected to the plug-in vehicle when the voltage of the pilot signal is changed from an initial value V1 (for example, 12 V) to V2 (for example, 9 V).

Then, the CCID of the charging cable informs the ECU of the plug-in vehicle of the rated current of a power supply facility by transmitting a pilot signal with a duty ratio corresponding to the rated current of the power supply facility (including an external power supply and a charging cable).

Subsequently, the ECU of the plug-in vehicle informs the CCID of the charging cable of completion of the preparation for charging by changing the voltage of the pilot signal from V2 to V3 (for example, 6 V).

Then, when detecting that the voltage of the pilot signal has changed from V2 to V3, the CCID of the charging cable determines that the preparation for charging of the plug-in vehicle side is completed, and turns on a relay used to supply the power of the external power supply to the plug-in vehicle (that is, starts the supply of power).

In this way, the pilot signal is a signal essential for controlling the charging of the plug-in vehicle and it is very important to detect abnormality of the pilot signal. For example, Japanese Unexamined Patent Application, First Publication No. 2009-71989 discloses a technique of detecting a disconnection of a control line used for transmission of a pilot signal in a state where a plug-in vehicle is connected to an external power supply via a charging cable.

2. Description of the Related Art

As described in Japanese Unexamined Patent Application, First Publication No. 2009-71989, the pilot signal is input to a CPU (Central Processing Unit) via an input buffer in an ECU of the plug-in vehicle. Since a recommended input voltage range is determined for the input buffer but the voltage of the pilot signal varies in a broad range, the input buffer may not work normally or the input buffer may be destroyed in a worst case. Accordingly, a circuit for protecting the input buffer is necessary, but such a circuit is not disclosed in Japanese Unexamined Patent Application, First Publication No. 2009-71989.

The invention is made in consideration of the above-mentioned circumstances and an object thereof is to provide an electronic control unit that can protect an input buffer for a pilot signal, which a pilot signal is input to, disposed in a stage preceding a processor such as a CPU when a plug-in vehicle is charged from an external power supply via a charging cable.

SUMMARY OF THE INVENTION

The present invention employs the following configurations to solve the above problems.

(1) According to an aspect of the invention, there is provided an electronic control unit that is mounted on a vehicle which is configured to be charged with an external power supply and that receives a pilot signal via a charging cable before being supplied with a power when the vehicle is connected to the external power supply via the charging cable, the electronic control unit including: a pilot voltage setting circuit that changes a voltage of the pilot signal in a stepwise manner; a processor that performs a process necessary for a control of charging based on the pilot signal, and that controls the pilot voltage setting circuit to change the voltage of the pilot signal; an input buffer that is disposed in a stage preceding a pilot signal input port of the processor; and an input buffer voltage setting circuit that changes the input voltage of the input buffer so as to be within a recommended input voltage range of the input buffer based on the change in the voltage of the pilot signal.

(2) In the electronic control unit described in (1) above, the input buffer voltage setting circuit may be a resistance-type voltage division circuit of which a division ratio can be switched and may change the input voltage of the input buffer so as to be within the recommended input voltage range of the input buffer by switching the division ratio of the resistance-type voltage division circuit based on the change in the voltage of the pilot signal.

(3) In the electronic control unit described in (2) above, the pilot voltage setting circuit may include: a pull-down resistor of which one end thereof is connected to a pilot signal line extending from a pilot signal input terminal of the electronic control unit to the input buffer; and a first switching element that is connected between other end of the pull-down resistor and a ground and that is switched between ON and OFF states based on a control signal output from the processor, and the input buffer voltage setting circuit may include: a first voltage-dividing resistor that is disposed in the pilot signal line in a stage following the pilot voltage setting circuit; a second voltage-dividing resistor of which one end thereof is connected to the pilot signal line between the first voltage-dividing resistor and the input buffer; a third voltage-dividing resistor of which one end thereof is connected to other end of the second voltage-dividing resistor and other end is connected to the ground; a level inverter circuit that receives the control signal output from the processor and that inverts and outputs the level of the control signal; and a second switching element that is connected in parallel to the third voltage-dividing resistor and that is switched between ON and OFF states based on the control signal output from the level inverter circuit.

BRIEF DESCRIPTION OF THE DRAWINGS

FIG. 3 is a timing diagram illustrating the operation of the vehicle charging system.

DETAILED DESCRIPTION OF THE INVENTION

Hereinafter, an embodiment of the invention will be described in detail with reference to the accompanying drawings.

Figure 1:
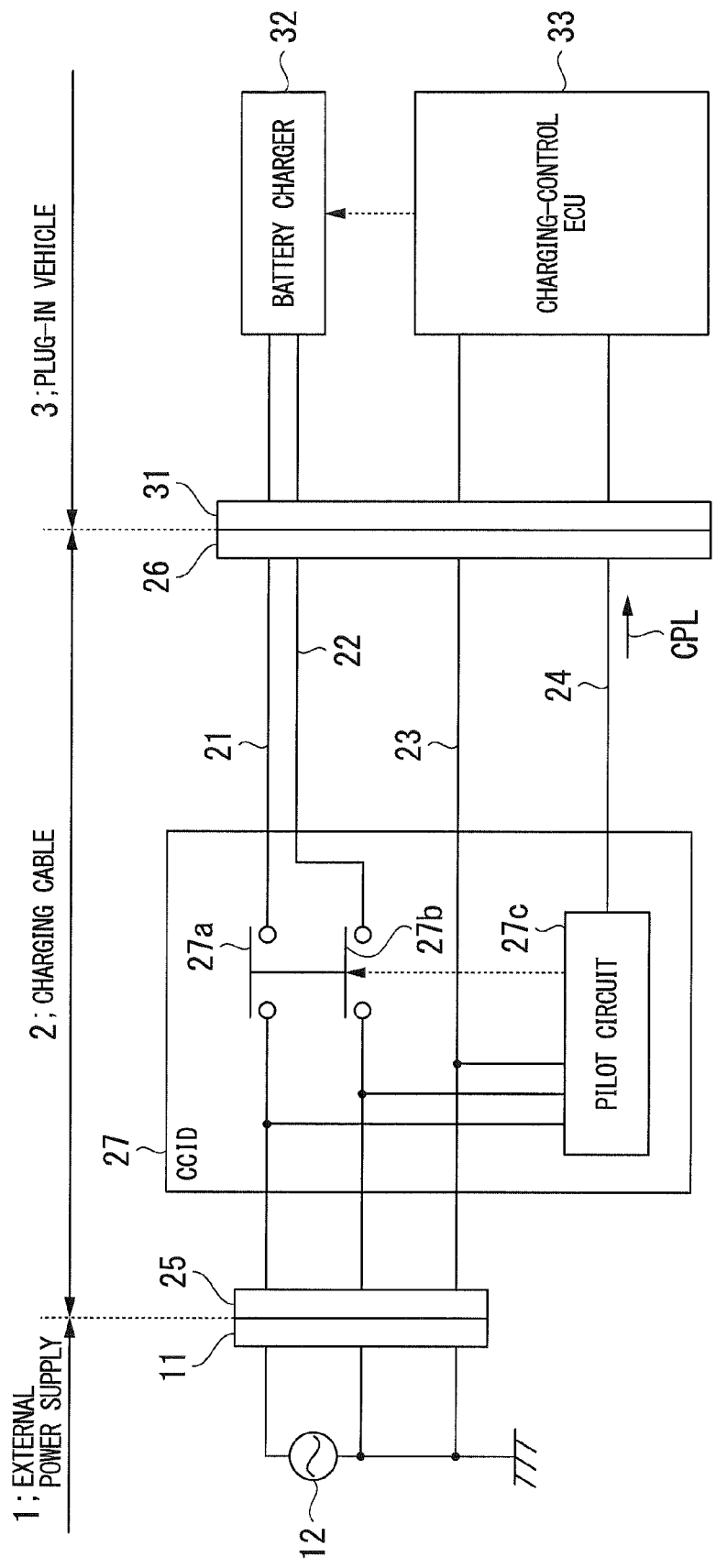
FIG. 1 is a schematic diagram illustrating a vehicle charging system according to an embodiment of the invention.

FIG. 1 is a schematic diagram illustrating a vehicle charging system according to an embodiment of the invention. As shown in FIG. 1, the vehicle charging system according to this embodiment includes an external power supply 1, a charging cable 2, and a plug-in vehicle 3. The external power supply 1 includes a power receptacle 11 with a ground terminal disposed, for example, in a house and an AC power supply (commercial power supply) 12 supplying single-phase AC power to the power receptacle 11.

The charging cable 2 includes two power supply lines 21 and 22, a ground line 23, a pilot line 24, a plug 25, a cable-side coupler 26, and a CCID 27. In each of the power supply lines 21 and 22 and the ground line 23, an end thereof is connected to the plug 25 and the other end thereof is connected to the cable-side coupler 26. An end of the pilot line 24 is connected to the CCID 27 (specifically, a pilot circuit 27c) and the other end thereof is connected to the cable-side coupler 26.

By connecting the plug 25 to the power receptacle 11, one end of each of the power supply lines 21 and 22 is connected to the AC power supply 12 and one end of the ground line 23 is connected to the ground of the external power supply 1. By connecting the cable-side coupler 26 to a vehicle-side coupler 31 of the plug-in vehicle 3, the other end of each of the power supply lines 21 and 22 is connected to a battery charger 32 of the plug-in vehicle 3 and the other end of each of the ground line 23 and the pilot line 24 is connected to a charging-control ECU 33 of the plug-in vehicle 3.

The CCID 27 is a control unit that is disposed in the middle of the power supply lines 21 and 22 and the ground line 23, and includes relays 27a and 27b disposed in the middle of the power supply lines 21 and 22 and a pilot circuit 27c transmitting a pilot signal CPL to the charging-control ECU 33 of the plug-in vehicle 3 via the pilot line 24 and controlling ON and OFF states of the relays 27a and 27b. The pilot circuit 27c is connected to the power supply lines 21 and 22 and the ground line 23 and is supplied with a source voltage from the power supply lines 21 and 22 and with a ground voltage from the ground line 23.

The plug-in vehicle 3 is a vehicle which can be charged with the external power supply 1, such as an electric car or a plug-in hybrid car, and includes a vehicle-side coupler 31, a battery charger 32, and a charging-control ECU 33. By connecting the cable-side coupler 26 of the charging cable 2 to the vehicle-side coupler 31, the power supply lines 21 and 22 are connected to the battery charger 32, and the ground line 23 and the pilot line 24 are connected to the charging-control ECU 33.

The battery charger 32 is a charging circuit that converts single-phase AC power supplied from the external power supply 1 via the charging cable 2 (the power supply lines 21 and 22) into DC power under the control of the charging-control ECU 33 and that charges a driving battery (not shown) mounted on the plug-in vehicle 3 with the DC power. The charging-control ECU 33 is an electronic control unit that receives a pilot signal CPL via the charging cable 2 before being supplied with the power when the plug-in vehicle 3 is connected to the external power supply 1 via the charging cable 2 and that performs a process necessary for the charging control of the driving battery based on the pilot signal CPL.

Figure 2:
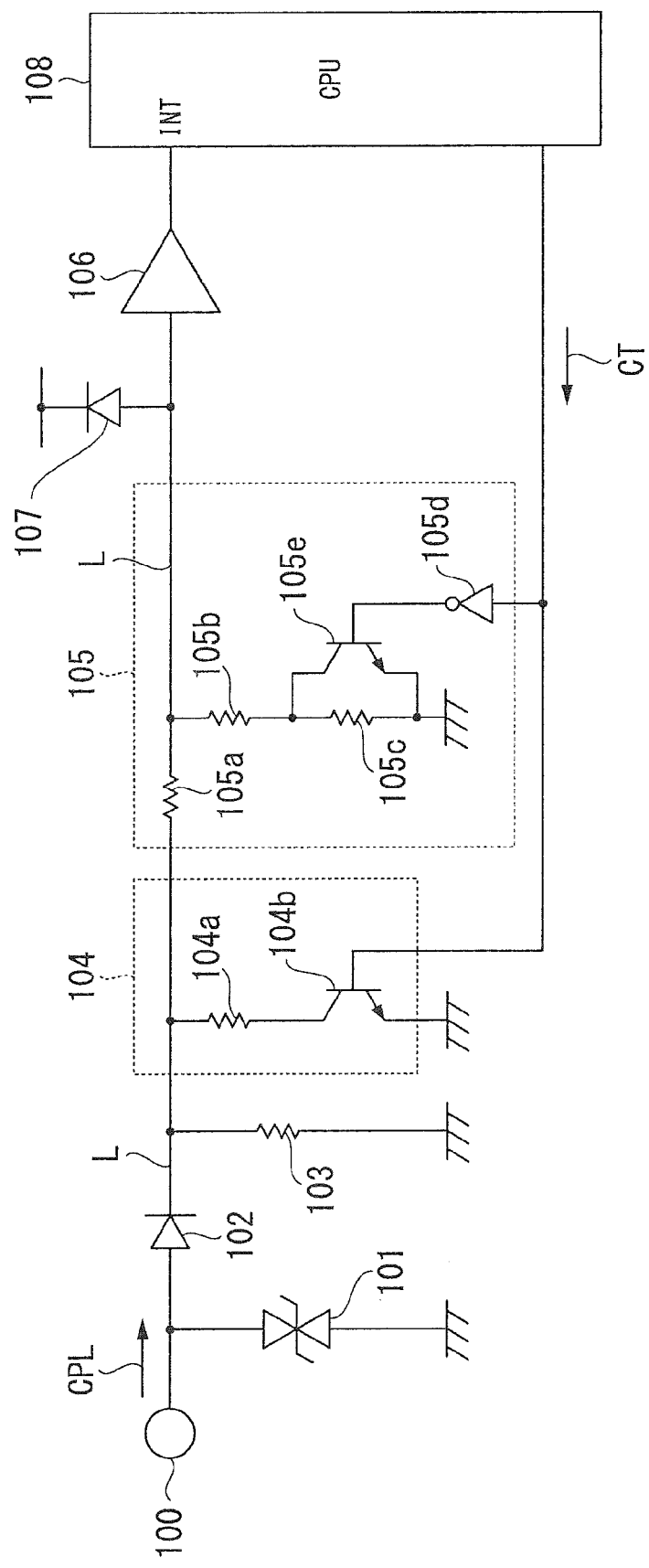
FIG. 2 is a diagram illustrating the internal configuration of a charging-control ECU 33 mounted on a plug-in vehicle 3.

FIG. 2 is a diagram illustrating the internal configuration of the charging-control ECU 33. As shown in FIG. 2, the charging-control ECU 33 includes a pilot signal input terminal 100, an avalanche diode 101, a first diode 102, a first pull-down resistor 103, a pilot voltage setting circuit 104, an input buffer voltage setting circuit 105, an input buffer 106, a second diode 107, and a CPU 108.

The pilot signal input terminal 100 is an external input terminal that is connected to the pilot line 24 when the cable-side coupler 26 of the charging cable 2 is connected to the vehicle-side coupler 31. The avalanche diode 101 has one end connected to the pilot signal input terminal 100 and the other end connected to the ground and serves to maintain the voltage of the pilot signal CPL (the voltage between the pilot signal input terminal 100 and the ground) input via the pilot signal input terminal 100 at V1 (for example, 12 V) or lower.

The first diode 102 has an anode terminal connected to the pilot signal input terminal 100 and a cathode terminal connected to one end of the first pull-down resistor 103 and serves to pass only a positive signal of the pilot signal CPL. The first pull-down resistor 103 has one end connected to the cathode terminal of the first diode 102 and the other end connected to the ground and serves to change the positive voltage of the pilot signal CPL (that is, the voltage between the cathode terminal of the first diode 102 and the ground) from V1 to V2 (for example, 9 V).

The pilot voltage setting circuit 104 is a circuit that changes the positive voltage of the pilot signal CPL in a stepwise manner (for example, changes the voltage from V2 to V3 (for example, 6 V)) under the control of the CPU 108. The pilot voltage setting circuit 104 includes a second pull-down resistor 104a of which one end is connected to the cathode terminal of the first diode 102 (connected to the pilot signal line L extending from the pilot signal input terminal 100 to the input buffer 106) and a first switching element (for example, a transistor) 104b that is connected between the other end of the second pull-down resistor 104a and the ground and that is switched between ON and OFF states depending on a control signal CT output from the CPU 108.

In the pilot voltage setting circuit 104 having this configuration, when the first switching element 104b is in ON state, the other end of the second pull-down resistor 104a is connected to the ground and the positive voltage of the pilot signal CPL is changed from V2 to V3.

The input buffer voltage setting circuit 105 is a resistance-type voltage division circuit of which the division ratio can be switched and is a circuit that changes the input voltage of the input buffer 106 to be within a recommended input voltage range (for example, a range of 3.5 to 5.5 V) of the input buffer 106 by switching the division ratio of the resistance-type voltage division circuit depending on the change in voltage of the pilot signal CPL.

Specifically, the input buffer voltage setting circuit 105 includes a first voltage-dividing resistor 105a disposed in the middle of the pilot signal line L in a stage following the pilot voltage setting circuit 104, a second voltage-dividing resistor 105b of which an end is connected to the pilot signal line L between the first voltage-dividing resistor 105a and the input buffer 106, a third voltage-dividing resistor 105c of which one end is connected to the other end of the second voltage-dividing resistor 105b and the other end is connected to the ground, a level inverter circuit 105d that receives the control signal CT output from the CPU 108 and that inverts and outputs the level of the control signal CT, and a second switching element (for example, a transistor) 105e that is connected in parallel to the third voltage-dividing resistor 105c and that is switched between ON and OFF states depending on the inverted control signal CT output from the level inverter circuit 105d.

In the input buffer voltage setting circuit 105 having this configuration, when the positive voltage of the pilot signal CPL is V2 (9 V), the first switching element 104b is in OFF state and thus the second switching element 105e is switched to ON state. Here, when the resistance value of the first voltage-dividing resistor 105a is defined as R1, the resistance value of the second voltage-dividing resistor 105b is defined as R2, and the resistance value of the third voltage-dividing resistor 105c is defined as R3, the division ratio when the second switching element 105e is in ON state is expressed by R2/(R1+R2). By the use of this division ratio, the resistance values R1 and R2 are set such that the input voltage of the input buffer 106 (the voltage between one end of the second voltage-dividing resistor 105b and the ground) is equal to or lower than 5.5 V which is the maximum value of the recommended input voltage range of the input buffer 106.

On the other hand, when the positive voltage of the pilot signal CPL is V3 (6 V), the first switching element 104b is in ON state and thus the second switching element 105e is switched to OFF state. The division ratio when the second switching element 105e is in OFF state is expressed by (R2+R3)/(R1+R2+R3). By the use of this division ratio, the resistance values R1, R2, and R3 are set such that the input voltage of the input buffer 106 is equal to or higher than 3.5 V which is the minimum value of the recommended input voltage range of the input buffer 106.

The input buffer 106 is a buffer of which an input terminal is connected to the other end of the first voltage-dividing resistor 105a and one end of the second voltage-dividing resistor 105b and an output terminal is connected to a pilot signal input port INT of the CPU 108 (that is, disposed in a stage preceding the pilot signal input port INT of the CPU 108). As described above, for example, a recommended input voltage range of 3.5 to 5.5 V is determined for the input buffer 106. The pilot signal CPL is input to the CPU 108 via the input buffer 106.

The second diode 107 has an anode terminal connected to the input terminal of the input buffer 106 and a cathode terminal connected to the power supply line. The second diode 107 is provided to clamp and protect the input voltage of the input buffer 106 so as not to be greater than the maximum rated voltage (for example, 7 V).

The CPU 108 is a processor that performs a process necessary for the charging control and controls the pilot voltage setting circuit 104 and the input buffer voltage setting circuit 105 (outputs the control signal CT) to change the voltage of the pilot signal CPL, based on the pilot signal CPL input to the pilot signal input port INT via the input buffer 106.

The operation of the vehicle charging system having the above-mentioned configuration will be described below with reference to the timing diagram of FIG. 3.

First, at time t1 in FIG. 3, when the plug 25 of the charging cable 2 is connected to the power receptacle 11 of the external power supply 1, the pilot circuit 27c of the CCID 27 is supplied with power from the AC power supply 12 via the power supply lines 21 and 22, is started up, and outputs the pilot signal CPL of a voltage value V1 (12 V) via the pilot line 24. At this time point, the relays 27a and 27b of the CCID 27 are in OFF state and the CPU 108 of the charging-control ECU 33 is in a sleep state.

As shown in FIG. 3, when the CPU 108 is in the sleep state, the control signal CT output from the CPU 108 is at a low level. Accordingly, the first switching element 104b of the pilot voltage setting circuit 104 is in OFF state and the second switching element 105e of the input buffer voltage setting circuit 105 is in ON state.

Subsequently, at time t2 in FIG. 3, when the cable-side coupler 26 of the charging cable 2 is connected to the vehicle-side coupler 31 of the plug-in vehicle 3, the pilot signal CPL is input to the pilot signal input terminal 100 of the charging-control ECU 33, but the positive voltage of the pilot signal CPL (the voltage between the cathode terminal of the first diode 102 and the ground) is changed from V1 to V2 (9 V) by the first pull-down resistor 103.

In this way, after time t2, the positive voltage of the pilot signal CPL (the voltage between the cathode terminal of the first diode 102 and the ground) input to the charging-control ECU 33 is V2 (9 V). However, since the first switching element 104b is in OFF state and the second switching element 105e is in ON state, the division ratio of the input buffer voltage setting circuit 105 is R2/(R1+R2) and the input voltage of the input buffer 106 is suppressed to be equal to or less than 5.5 V which is the maximum value of the recommended input voltage range of the input buffer 106.

When the change in voltage of the pilot signal CPL (the change in voltage of the pilot line 24) is detected, the pilot circuit 27c of the CCID 27 determines that the charging cable 2 is connected to the plug-in vehicle 3 and informs the charging-control ECU 33 of the rated current of the power supply facility by transmitting the pilot signal CPL at a duty ratio corresponding to the rated current of the power supply facility (the external power supply 1 and the charging cable 2) at time t3 in FIG. 3.

When the CPU 108 of the charging-control ECU 33 starts up from the sleep state at time t4 in a predetermined time after time t3, the CPU 108 measures the duty ratio of the pilot signal CPL input via the input buffer 106 to acquire the rated current of the power supply facility, then outputs the control signal CT of a high level at time t5 in FIG. 3 to switch the first switching element 104b to ON state (to switch the second switching element 105e to OFF state) and to change the voltage of the pilot signal CPL from V2 to V3 (6 V), whereby the CCID 27 of the charging cable 2 is informed of the completion of the preparation for charging.

In this way, after time t5, the positive voltage of the pilot signal CPL (the voltage between the cathode terminal of the first diode 102 and the ground) input to the charging-control ECU 33 becomes V3 (6 V). However, as described above, since the first switching element 104b is in ON state and the second switching element 105e is in OFF state, the division ratio of the input buffer voltage setting circuit 105 is (R2+R3)/(R1+R2+R3) and the input voltage of the input buffer 106 increases to be equal to or higher than 3.5 V which is the minimum value of the recommended input voltage range of the input buffer 106.

When the pilot circuit 27c of the CCID 27 detects that the voltage of the pilot signal CPL (the voltage of the pilot line 24) has changed from V2 to V3, the pilot circuit 27c determines that the preparation for charging of the plug-in vehicle 3 is completed and turns on the relays 27a and 27b for supplying the AC power of the external power supply 1 to the plug-in vehicle 3 (that is, starts the supply of power). Accordingly, the AC power is supplied from the external power supply 1 to the battery charger 32 of the plug-in vehicle 3 via the charging cable 2 (the power supply lines 21 and 22).

The CPU 108 of the charging-control ECU 33 appropriately controls the charging of the driving battery by controlling the battery charger 32 based on the rated current of the power supply facility acquired from the duty ratio of the pilot signal CPL.

As described above, according to this embodiment, since the input voltage of the input buffer 106 for the pilot signal CPL disposed in the stage preceding the CPU 108 is set to be within the recommended input voltage range thereof depending on the change in voltage of the pilot signal CPL, it is possible to protect the input buffer 106 for a pilot signal CPL when the plug-in vehicle 3 is charged with the external power supply 1 via the charging cable 2.

The invention is not limited to the above-mentioned embodiment, but may be modified as follows.

For example, the embodiment employs the configuration in which the voltage of the pilot signal CPL is automatically changed from V1 to V2 at the time point at which the charging cable 2 is connected to the plug-in vehicle 3 (at time t2 in FIG. 3).

However, the invention is not limited to this configuration, and may employ a configuration in which the CPU 108 is started up at the time at which the charging cable 2 is connected to the plug-in vehicle 3, that is, when the pilot signal CPL of a voltage value V1 is input to the charging-control ECU 33, and the voltage of the pilot signal CPL is changed from V1 to V2 under the control of the CPU 108.

What is claimed is:

1. An electronic control unit that is mounted on a vehicle which is configured to be charged with an external power supply and that receives a pilot signal via a charging cable before being supplied with a power when the vehicle is connected to the external power supply via the charging cable, the electronic control unit comprising:
   a processor that performs a process necessary for control of charging based on the pilot signal;
   an input buffer that is disposed in a stage preceding a pilot signal input port of the processor;
   a pilot voltage setting circuit that changes a voltage of the pilot signal in a stepwise manner depending on a control signal output from the processor while the vehicle, the charging cable, and the external power supply are connected; and
   an input buffer voltage setting circuit that is a division circuit which divides the voltage of the pilot signal, and that has an output terminal connected to an input terminal of the input buffer;
   wherein
   a division ratio of the input buffer voltage setting circuit is switched depending on the control signal so that an input voltage of the input buffer is set to be within a recommended input voltage range of the input buffer;
   wherein the pilot voltage setting circuit, the input buffer voltage setting circuit, the input buffer, and the processor are arranged in a line in this order.

2. The electronic control unit according to claim 1, wherein the pilot voltage setting circuit changes a voltage of the pilot signal for recognition of connection between the vehicle and the charging cable to a voltage of the pilot signal for information of the completion of the preparation for charging.

3. The electronic control unit according to claim 2, wherein when a level of the control signal is first level, the division ratio of the input buffer voltage setting circuit is set so that the input voltage of the input buffer does not exceed a maximum value of the recommended input voltage range of the input buffer; and after the level of the control signal changes from the first level to second level, the division ratio of the input buffer voltage setting circuit is set so that the input voltage of the input buffer exceeds a minimum value of the recommended input voltage range of the input buffer.

4. An electronic control unit that is mounted on a vehicle which is configured to be charged with an external power supply and that receives a pilot signal via a charging cable before being supplied with a power when the vehicle is connected to the external power supply via the charging cable, the electronic control unit comprising:
   a processor that performs a process necessary for control of charging based on the pilot signal;
   an input buffer that is disposed in a stage preceding a pilot signal input port of the processor;
   a pilot voltage setting circuit that changes a voltage of the pilot signal in a stepwise manner depending on a control signal output from the processor while the vehicle, the charging cable, and the external power supply are connected; and
   an input buffer voltage setting circuit that is a division circuit which divides the voltage of the pilot signal, and that has an output terminal connected to an input terminal of the input buffer;
   wherein a division ratio of the input buffer voltage setting circuit is switched depending on the control signal so that an input voltage of the input buffer is set to be within a recommended input voltage range of the input buffer;
   wherein the pilot voltage setting circuit comprises:
   a pull-down resistor of which one end thereof is connected to a pilot signal line extending from a pilot signal input terminal of the electronic control unit to the input buffer; and
   a first switching element that is connected between other end of the pull-down resistor and a ground and that is switched between ON and OFF states based on a control signal output from the processor, and
   wherein the input buffer voltage setting circuit comprises:
   a first voltage-dividing resistor that is disposed in the pilot signal line in a stage following the pilot voltage setting circuit;
   a second voltage-dividing resistor of which one end thereof is connected to the pilot signal line between the first voltage-dividing resistor and the input buffer;
   a third voltage-dividing resistor of which one end thereof is connected to other end of the second voltage-dividing resistor and other end is connected to the ground;
   a level inverter circuit that receives the control signal output from the processor and that inverts and outputs the level of the control signal; and
   a second switching element that is connected in parallel to the third voltage-dividing resistor and that is switched between ON and OFF states based on the control signal output from the level inverter circuit.

5. The electronic control unit according to claim 4, wherein the pilot voltage setting circuit changes a voltage of the pilot signal for recognition of connection between the vehicle and the charging cable to a voltage of the pilot signal for information of the completion of the preparation for charging.

* * * * *